June 28, 1949.   H. G. NORDLIN   2,474,272
COAXIAL LINE TERMINATION

Filed June 25, 1945   3 Sheets-Sheet 1

INVENTOR.
HENRY G. NORDLIN
BY
ATTORNEY

June 28, 1949.　　　　H. G. NORDLIN　　　　2,474,272
COAXIAL LINE TERMINATION

Filed June 25, 1945　　　　　　　　　　　　3 Sheets-Sheet 2

INVENTOR.
HENRY G. NORDLIN
BY
ATTORNEY

June 28, 1949.  H. G. NORDLIN  2,474,272
COAXIAL LINE TERMINATION

Filed June 25, 1945  3 Sheets-Sheet 3

INVENTOR.
HENRY G. NORDLIN
BY
ATTORNEY

Patented June 28, 1949

2,474,272

UNITED STATES PATENT OFFICE 2,474,272

COAXIAL LINE TERMINATION

Henry G. Nordlin, East Orange, N. J., assignor to Federal Telephone and Radio Corporation, New York, N. Y., a corporation of Delaware Application June 25, 1945, Serial No. 601,395

7 Claims. (Cl. 178—44)

This invention relates to high frequency wave transmission and more particularly to networks for connection with high frequency transmission lines.

The principal object is to provide a network whose input impedance may be made essentially a variable resistance, and the variation of which may be accomplished by a simple control.

In the art of electrical wave transmission at ultra-high frequencies, it is often desirable for testing or other purposes to terminate the line by a pure resistance; and it is furthermore desirable to be able to vary this resistance by a simple control. A typical instance is a coaxial line, for example a slotted coaxial cable having an air dielectric. This type of line is often used at frequencies in the general order of 50 to 200 megacycles, more or less. The methods heretofore used to terminate such a line have not been as practical as desired owing to the difficulty and complication of making the adjustments required to obtain a pure resistance termination of the desired magnitude.

According to my invention, I provide a simple compact network arrangement which may be very simply adjusted for the frequency being used, and which requires only a single control movement for obtaining the desired resistance variation. I carry out my invention by the provision of a tuned primary and a tuned secondary circuit, coupled together by a variable inductive coupling. The primary circuit constitutes the input of the network which is to be connected with the transmission line to be terminated, and both circuits are tuned to zero reactance at the frequency used on the line. Under this condition, the input impedance to the network is a pure resistance whose magnitude is dependent on the degree of coupling between the primary and secondary circuits of the network.

A feature of my invention resides in a relative mechanical movement of the primary and secondary inductances to vary the coupling, and consequently the effective resistance of the network, by a simple mechanical control. More particularly, I organize the control by mounting the inductance and capacity elements of one of the circuits of the network on a movable support, operated by the control device. In this way the connecting wires of each circuit are kept short, while allowing one inductance to move relative to the other. A related feature is the positioning in substantially parallel planes of a pair of loops, constituting the respective primary and secondary inductances; one of the loops being movable in its plane to vary the coupling between the loops.

Other features of my invention reside in the arrangement for providing shielding to avoid false impedance effects.

The foregoing and other features will be better understood by reference to the following detailed description and the accompanying drawings of which:

Figure 1:
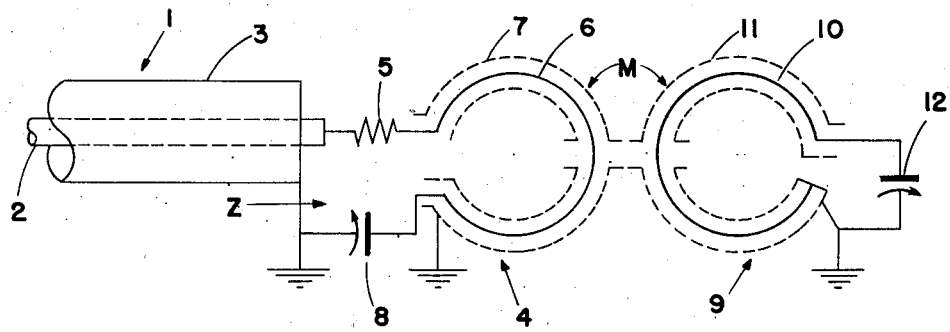
Fig. 1 illustrates schematically an impedance matching network of the type provided by my invention, connected to terminate a coaxial line.

In Fig. 1 there is shown in conventional form the end of a coaxial line 1 having the usual central conductor 2 and outer conductor 3 held concentrically around the inner conductor by suitable spacers (not shown) providing an air space between the inner and outer conductors. The line may conveniently, although not necessarily, be of the slotted type. As is well known, such a line is composed of distributed inductance and capacity and it is ordinarily designed to have a characteristic impedance at the frequency of its intended use, which is a pure resistance of a desired value. In accordance with well known transmission theory, such a line will deliver the maximum power to a load when the load terminating the line is a pure resistance equal in magnitude to the characteristic impedance or resistance of the line. Under this condition, there are no wave reflections at the end of the line and no standing waves are set up in the line, and the voltage at all points along the line remains constant except for the comparatively negligible effects of attenuation.

The network terminating the line in Fig. 1 is arranged so that it can readily be made to provide the desired pure resistance termination, with the magnitude of the resistance made variable so that adjustment can be quickly made for the optimum condition of zero or minimum standing wave. The primary circuit 4 comprises, in series, a resistor 5, an inductive loop 6 surrounded by a grounded shield 7, and a variable condenser 8. The condenser is preferably placed at the ground side of the line with its movable plate or plates grounded, as shown, to minimize undesirable capacity effects during its tuning adjustment. The secondary circuit 9 comprises the inductive loop 10 shielded by a grounded shield 11 and closed by variable condenser 12. Again, the movable condenser plate or plates are preferably connected at the ground side as shown. The primary and secondary inductive loops 6 and 10 respectively, are placed in inductive relation with each other with a variable mutual inductance M between them.

According to standard circuit analysis, the input impedance Z looking into the primary circuit of the terminating network is given by the equation:

$$Z = R_1 + JX_1 + \frac{\omega^2 M^2}{R_2 + JX_2} \quad (1)$$

where:

$R_1$ is the total primary circuit resistance
$JX_1$ is the total primary circuit reactance
$R_2$ is the total secondary circuit resistance
$JX_2$ is the total secondary circuit reactance
$\omega$ is $2\pi$ times the frequency
M is the mutual inductance between the primary and secondary coils.

When condensers 8 and 12 are adjusted so that the primary and secondary circuits are each made to have zero reactance at the frequency on the line, Equation 1 becomes:

$$Z = R_1 + \frac{\omega^2 M^2}{R_2} \quad (2)$$

Accordingly, the input impedance Z is a pure resistance consisting of the total primary circuit resistance plus the resistance reflected into the primary circuit from the secondary circuit. This reflected resistance increases with increase in the inductive coupling. Accordingly, the input impedance Z is a pure resistance which can be varied by varying the coupling.

Figure 2:
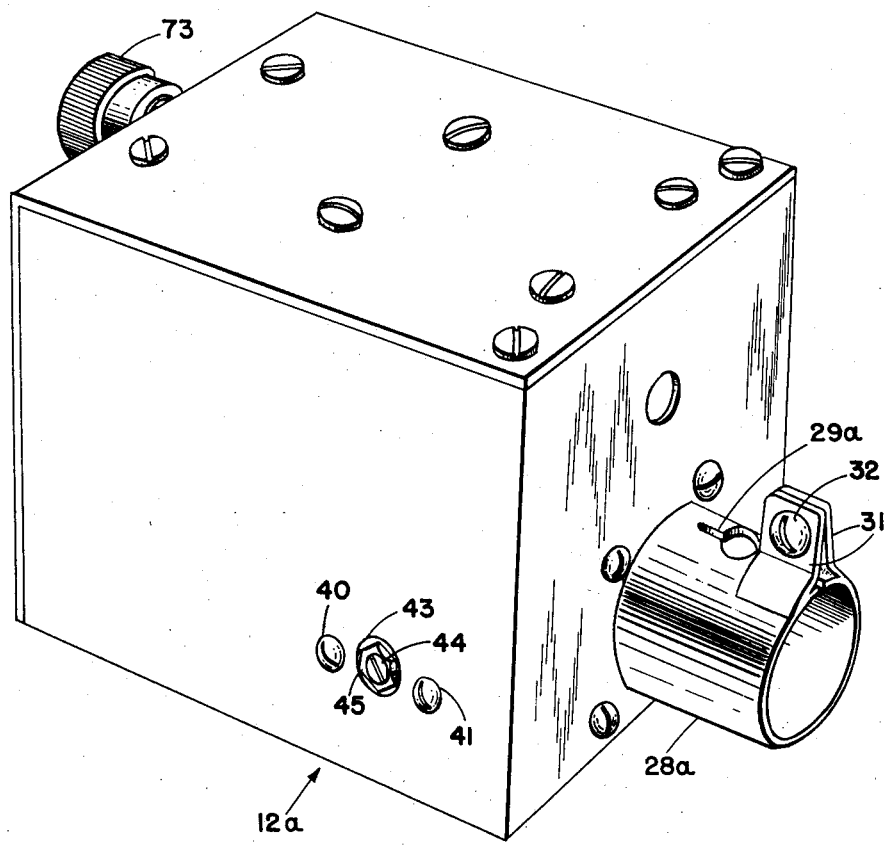
Fig. 2 illustrates a shielding box or a compartment arranged to contain the network according to my invention.
Figure 3:
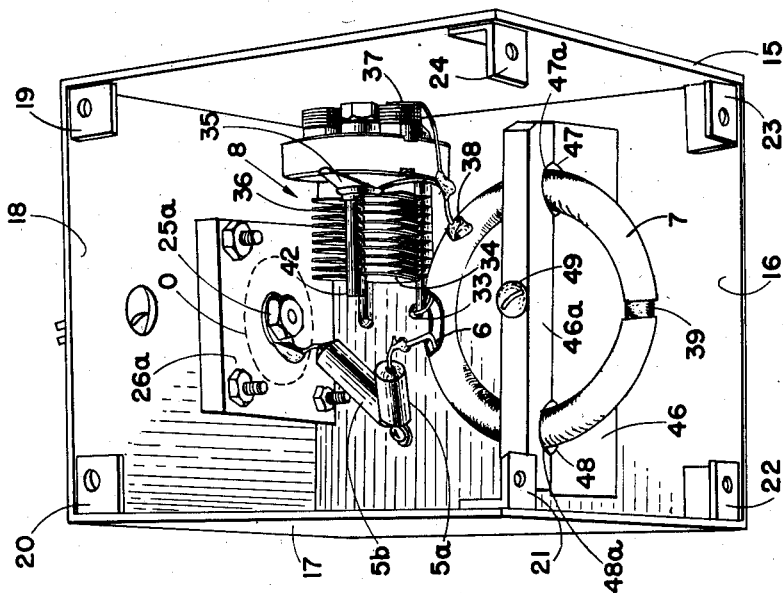
Fig. 3 illustrates a portion of the interior of the box of Fig. 2, and shows the primary circuit elements.
Figure 4:
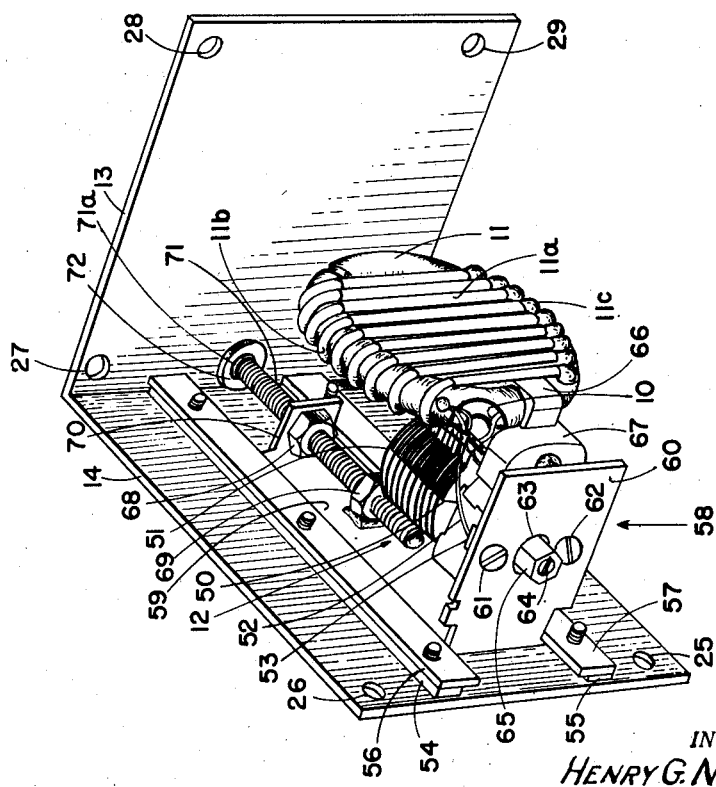
Fig. 4 shows the remaining interior portion of the box adapted to fit with the portion shown in Fig. 2, and shows the elements of the secondary circuit.

Figs. 2, 3 and 4 show the mechanical arrangement and organization of the circuit elements of the impedance terminating network, as I have devised them to perform the function shown in Fig. 1. The elements are shown placed in a six-sided compartment or box 12a of conducting material which provides a shielding effect. It will be understood, however, that some other suitable shape might be chosen instead if desired. In Figs. 3 and 4, the box is shown with two of its sides 13 and 14 separated from the remaining four sides 15, 16, 17 and 18. The open ends of the four sides shown in Fig. 3 are provided with angle pieces 19, 20, 21, 22, 23, and 24, through each of which a hole is drilled and tapped to receive suitable fastening screws placed through respective holes 25, 26, 27, 28 and 29 (the last hole for engagement with angle piece 24, not being visible on the drawing).

Figure 5:
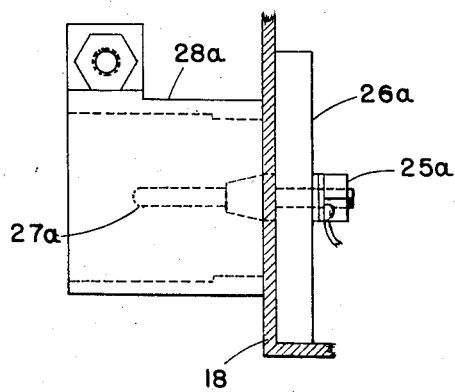
Fig. 5 shows a detail of the construction in Fig. 2.

The primary circuit elements are mounted within the box portion in Fig. 3. The primary inductance is single loop 6 connected at one end in series with resistors 5a and 5b, these resistors together constituting the resistance 5 in Fig. 1; these resistors are preferably the non-inductive carbon type. The loop 6 may be made from a length of flexible coaxial cable the outer conductor of which is preferably of a braided metal construction to act as the grounded shield 7 of Fig. 1, to prevent undesired stray capacitive couplings. A gap is provided in this shield at the insulating spacer 39; this gap provides a desired discontinuity in the shield. The second of the series-connected resistors, 5b, is connected to the terminal 25a of the terminal plug 27a centrally fastened through insulating block 26a covering hole O through wall 18, so that the plug protrudes outwardly through the hole from the box, as shown in Fig. 5.

A cylindrical coupling member 28a is mounted on the outside of wall 18 concentrically surrounding plug 27a and fitted to hole O; and the inner circular end of the coupling member is suitably fastened to wall 18 for example by brazing or welding. The coupling 28a is of the proper internal diameter so that it will nicely receive the outer cylindrical conductor 3 of the coaxial line. The coupling is provided with a longitudinal slot 29a; and a pair of tightening flanges 31 are formed from the member on either side of the slot so that a fastening nut and bolt 32 may be attached through the holes to tighten the coupling member around the outer sheath of the coaxial line, while the inner conductor 2 of the coaxial line is attached to plug 27a. For this latter purpose, a coaxial hole should be drilled into the end of conductor 2 to receive the plug 27.

The end of loop 6 opposite from the resistor 5a is connected in series to terminal 33 of stator plates 34 of the variable condenser 8. The terminal 35 of the movable condenser plates 36 is grounded to the box at the condenser mounting 37, and is also connected at 38 with the braided shield 7 which is located concentrically around loop 6. The two mounting screws 40 and 41 for the condenser are brought through the box wall 15. The rotor shaft 42 is brought through a hole 43 in the same wall and the outer end of this shaft is made practically flush with the outer surface of the wall and the end of the shaft is slotted at 44 to receive a screw driver for turning the rotor. A lock nut 45 holds the rotor in position after the adjustment is made.

The shielded loop 6 is mounted in a fixed position by a mounting block 46 suitably fastening to wall 16. This mounting block is provided at its outer edge with a pair of semi-circular cut-outs 47 and 48 suitably spaced and dimensioned to receive the shield 7. A corresponding fastening block 46a, provided with corresponding cut-outs 47A and 48A, is fastened to block 46 by fastening screw 49.

The secondary circuit elements shown in Fig. 4 comprise the secondary loop 10 enclosed in the braided concentric shield 11, this shielded loop being similar in dimensions and construction to the primary shielded loop 6. For shielding purposes, there is placed across the shield 11 a grid 11A composed of spaced wires of high electrical conductivity such as copper. These grid wires may conveniently be looped around one side of the shield 11 as shown at 11B and individually soldered to the shield at their ends as shown at 11C. The loop 10 is closed through the variable condenser 12 comprising a set of stator plates 50 and a set of rotor plates 51. The lead 52 from one end of loop 10 is connected to the stator plates at the stator mounting lug 53, and the other end of loop 10 is connected to the rotor terminal and grounded shield 11.

The secondary loop and condenser are mounted so that together they may be moved relative to the side 14 of the box. For this purpose, the inside surface of side 14 is provided with a track comprising a pair of spaced strips 54 and 55, over which are fastened respectively strips 56 and 57. Strip 56 has its inner edge overlying strip 54 and strip 57 has its inner edge overlying strip 55.

The loop and condenser are mounted on an angle member 58 having one flat portion 59 adapted to be fitted within the track between strips 54 and 55 and held under the overlying edges of strips 56 and 57; and having the other portion 60 extending upright at a right angle from portion 59. By this arrangement portion 59 can be moved longitudinally along the track.

The condenser is supported directly on angle portion 60 by means of suitable screws 61 and 62 which hold the stator pillars. The rotor shaft is extended through a hole 63 in member 60, and the end of the shaft is slotted at 64. A lock nut 65 is provided to hold the rotor against movement in any desired position. The shielded loop is mounted in a bracket 66 which is bolted to the insulation mounting 67 of the condenser.

For the purpose of sliding the secondary assembly relative to plate 14, the angle member 59 has attached to it a pair of spaced threaded members 68 and 69. This attachment may be made in any suitable manner, for example by soldering or welding the nut 68 to a strip 70 which is welded to plate 59; and by directly soldering or welding nut 69 to the plate 59. A threaded bolt 71 provided with a collar 71a passes through opening 72 through wall 13 and through the threaded members 68 and 69; and a convenient knob 73 also provided with a collar to prevent endwise movement of the bolt is attached to the bolt outside the box as shown in Fig. 2. By turning the handle 73, the secondary assembly can be slowly slid one way or the other relative to side member 14.

Figure 6:
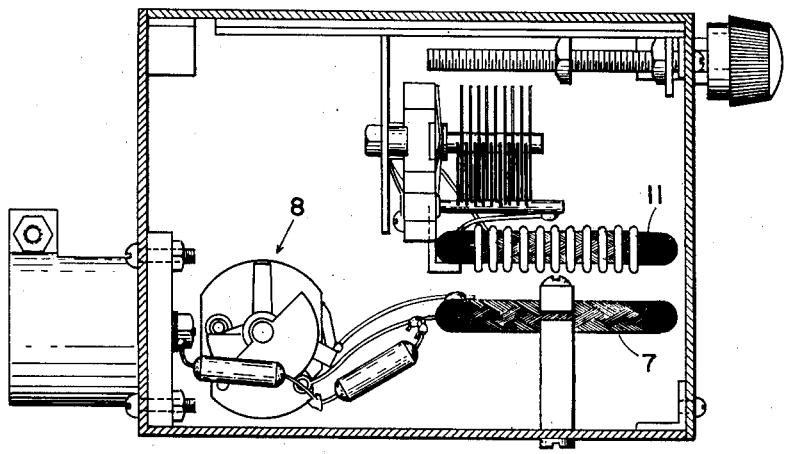
Fig. 6 shows the relative positions of the elements in the box.

When the structure of 3 and 4 are put together and the box finally assembled as shown in Fig. 2, the secondary loop 11 will be situated just above the primary loop 6 and will be slightly separated from the latter, for example, about ⅞ inch. The planes of the loops will be parallel with each other as indicated in Fig. 6. When the secondary loop is directly over the primary loop, maximum coupling M will exist. Rotation of handle 73 will move the secondary coil away from this position of maximum juxtaposition and thereby reduce the coupling and consequently reducing the resistance seen at the primary input.

In operation, the primary and secondary circuits will first be independently tuned to the frequency of the voltage impressed on the line, by independent adjustments of the respective primary and secondary condensers. When these independent adjustments for zero reactance are obtained, the lock nuts of the condensers may be set to hold the adjustments. With the device coupled to the end of the coaxial line by attachment of the line to members 27 and 28 there is provided a termination for the line which is substantially a pure resistance. The magnitude of this resistance may be greater or less than the characteristic resistance of the line, depending on the degree of coupling M. If there is any difference between the resistance of the terminating network and the characteristic resistance of the line, wave reflections will occur at the termination which will create standing waves in the line. The presence of such standing waves may be observed by probing at successive points along the line with a voltmeter probe. If differences in voltage along the line indicate a standing wave, the handle 73 may be rotated until the voltmeter will indicate no standing wave, that is, until the voltage at all points for a distance along the line is substantially the same. This will indicate the condition of accurate matching, that is, of the resistance of the terminating network being equal to the characteristic resistance of the line.

If the resistance of the terminating network differs from the characteristic resistance of the line, its magnitude can be computed from the following equation:

$$Z = Z_0 \cdot \frac{E_{max}}{E_{min}} \qquad (3)$$

when Z is a pure resistance; where $Z_0$ equals the characteristic resistance of the line, $E_{max}$ is the maximum standing wave voltage in the line, and $E_{min}$ is the minimum standing wave voltage in the line. The quantities $E_{max}$ and $E_{min}$ can readily be determined by use of a voltmeter probe.

An example of a practical use of my network is given by the following values which I have found useful in a specific application to slotted coaxial air lines having characteristic resistances between 50 and 75 ohms at frequencies from 75 megacycles per second to 92 megacycles per second:

Value of resistance 5—28.5 to 41.1 ohms
Spacing between loop planes—⅞"
Maximum capacity of variable condensers—50μμf.

With this construction, I have found that the range of resistance over which the adjustment can be made by varying the coupling is about 27 ohms. The particular values of minimum and maximum resistance of this range will of course depend on the particular value of resistor 5 which may be selected; and this will be chosen according to the characteristic resistance of the line.

It will be recognized from the foregoing description and explanation that I have provided a simple and efficient terminating network adapted for use with a high frequency coaxial line. The network is compactly arranged, and the elements are well shielded against stray capacity effects so that adjustment for frequency may readily be made. The tuning condenser for each circuit is placed close to its inductive loop and is in fixed relation thereto. By reason of the mounting of the secondary condenser in close proximity to the secondary loop and on the same movable bracket, errors from capacity effects are minimized. The capacitive shield around the loops further minimizes stray capacity effects; and the placing of the wire grid 11A at shield 11 prevents changes of capacity between the secondary condenser and ground, as the secondary system is moved by the adjusting knob.

While I have disclosed the principles of my invention in connection with one embodiment, it will be understood that this embodiment is given by way of example only and not as limiting the scope of the invention as set forth in the objects and the appended claims.

I claim:

1. A network adapted for terminating an ultrahigh frequency line whose characteristic impedance at a given operating frequency is substantially a pure resistance, said network comprising a primary circuit and a secondary circuit, the primary circuit comprising an inductive loop in series with an adjustable condenser and being adapted for terminating the line, the secondary circuit comprising an inductive loop closed through an adjustable condenser, the two circuits being normally tuned to substantial resonance at the said operating frequency, the two loops lying in planes which are substantially parallel to each other and being inductively related, the loop and condenser of one circuit being movable relative to the loop and condenser of the other circuit, a resistor being included in the primary circuit in series with the primary loop and condenser, said resistor being of a magnitude of the order of about one half the characteristic impedance of the line at the said operating frequency.

2. A network adapted for terminating an ultra-high frequency coaxial line whose characteristic impedance at a given operating frequency is substantially a pure resistance, said network comprising a primary circuit and a secondary circuit, the primary circuit comprising an inductive loop in series with an adjustable condenser and being adapted for terminating the line, the secondary circuit comprising an inductive loop closed through an adjustable condenser, grounded shielding means around each of the loops to protect the loops against stray capacitive couplings, the two loops lying in planes which are substantially parallel to each other and being inductively related, the loop and condenser of one circuit being movable relative to the loop and condenser of the other circuit in the plane of the movable loop.

3. Apparatus according to claim 2 in which grounded shielding means is situated between the condenser of the movable circuit and the loop and condenser of the other circuit.

4. A network adapted for terminating an ultra-high frequency line whose characteristic impedance at a given operating frequency is substantially a pure resistance, said network comprising a primary circuit and a secondary circuit, the primary circuit comprising an inductive loop in series with an adjustable condenser and a resistance and being adapted for terminating the line, the secondary circuit comprising an inductive loop closed through an adjustable condenser, the loop and condenser of the secondary circuit being mounted on a platform movable relative to the loop of the primary circuit in the plane of the secondary loop.

5. A network adapted for terminating an ultra-high frequency coaxial line whose characteristic impedance at a given operating frequency is substantially a pure resistance, said network being contained in a conductive shielded enclosure and comprising a primary circuit and a secondary circuit, the primary circuit comprising a shielded inductive loop in series with an adjustable condenser and a resistance, terminal means attached to the enclosure for connecting the primary circuit to terminate the line, the secondary circuit comprising a shielded inductive loop closed through an adjustable condenser, the two loops lying in planes which are substantially parallel to each other and being inductively related, the loop and condenser of the secondary circuit being mounted on a platform which is movable in the plane of the secondary loop, and manually operated means for moving said platform to vary the inductive coupling between the loops.

6. A network according to claim 5 in which the shields of the loops are grounded to the enclosure and a grounded grid-constructed electrostatic shield is mounted in relation to the secondary condenser to maintain shielding between the secondary condenser and the primary circuit elements when the platform is moved.

7. A network according to claim 5 in which the primary circuit and the secondary circuit are each tuned to zero reactance at the said operating frequency by adjustment of the condensers.

HENRY G. NORDLIN.

REFERENCES CITED

The following references are of record in the file of this patent:

UNITED STATES PATENTS

| Number | Name | Date |
|---|---|---|
| 1,488,310 | Birch-Field | Mar. 25, 1924 |
| 1,933,941 | Taylor | Nov. 7, 1933 |
| 2,017,131 | Posthumus et al. | Oct. 15, 1935 |
| 2,298,498 | Moore et al. | Oct. 13, 1942 |